US009627909B2

(12) United States Patent
Imai (10) Patent No.: US 9,627,909 B2
(45) Date of Patent: Apr. 18, 2017

(54) POWER SUPPLY DEVICE

(71) Applicant: IKS CO., LTD., Kyoto (JP)

(72) Inventor: Takashi Imai, Kyoto (JP)

(73) Assignee: IKS Co., Ltd., Kyoto (JP)

( * ) Notice: Subject to any disclaimer, the term of this patent is extended or adjusted under 35 U.S.C. 154(b) by 635 days.

(21) Appl. No.: 14/058,633

(22) Filed: Oct. 21, 2013

(65) Prior Publication Data

US 2014/0217820 A1    Aug. 7, 2014
US 2015/0035361 A9    Feb. 5, 2015

(30) Foreign Application Priority Data

Feb. 19, 2013   (JP) .............................. 2013-000862 U (51) Int. Cl.
*H02J 7/00*    (2006.01)
(52) U.S. Cl.
CPC ......... *H02J 7/0068* (2013.01); *Y10T 307/305* (2015.04); *Y10T 307/367* (2015.04)
(58) Field of Classification Search
CPC ............. H02J 1/102; H02J 3/36; H02J 7/0068
See application file for complete search history.

(56) References Cited

U.S. PATENT DOCUMENTS

| 5,334,926 A | * | 8/1994 | Imaizumi | ............... | H02J 7/1423 307/16 |
| 6,989,653 B2 | * | 1/2006 | Iwata | .................... | H02J 7/0016 320/134 |
| 2012/0235649 A1 | * | 9/2012 | Uno | .................... | H02M 1/4225 323/210 |

* cited by examiner

*Primary Examiner* — Jared Fureman
*Assistant Examiner* — Rafael Pacheco
(74) *Attorney, Agent, or Firm* — Alston & Bird LLP (57) ABSTRACT

Embodiments of the present invention include a power supply device having one or more converters (DC/DC and/or AC/DC) that convert input power supplied from one or more power sources, and a secondary battery which is charged by receiving power supplied from power sources. In addition, however, the power supply device has the unique feature of increasing power output by serially connecting the secondary battery to the DC/DC converter and/or AC/DC converter. In this regard, the secondary battery may comprise a Lithium Ion battery.

9 Claims, 9 Drawing Sheets

$$\eta 0 = \left(\frac{(1+n)\times \eta 1\times \eta 2}{(n\times \eta 1+\eta 2)}\right)\times \eta 3 = \left(\frac{(1+7)\times 0.9\times 0.98}{(7\times 0.9+0.98)}\right)\times 0.9 = 0.87$$

POWER SUPPLY DEVICE

CROSS-REFERENCE TO RELATED APPLICATION

This application claims priority to Japanese Utility Model Application No. 2013-000862 U, filed Feb. 19, 2013.

TECHNOLOGICAL FIELD

Example embodiments of the present invention relate generally to power supply devices, and, more particularly, to power supply devices having voltage converters.

BACKGROUND

Figure 1:
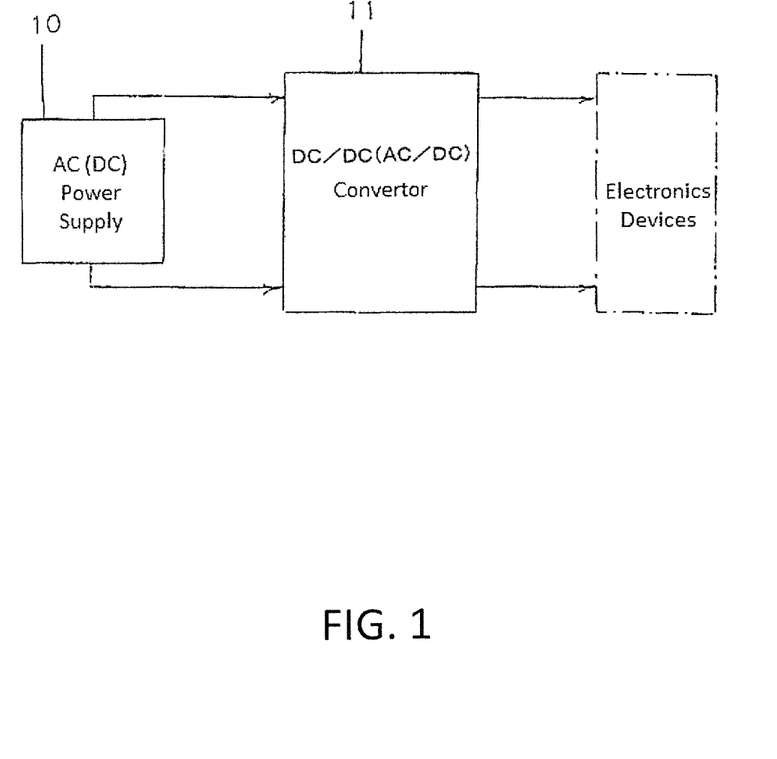
FIG. 1 illustrates a circuit diagram of a conventional power supply device.

Generally, it is common for home power sources that supply power to electronic devices (e.g., TVs, Radios, CD Radio Cassette Players, or the like) or electrical devices (e.g., power tools, or the like) to include a power source that supplies power and a converter that converts the supplied power to a voltage appropriate for use by the electronics and electrical devices, as shown in FIG. 1.

Figure 2:
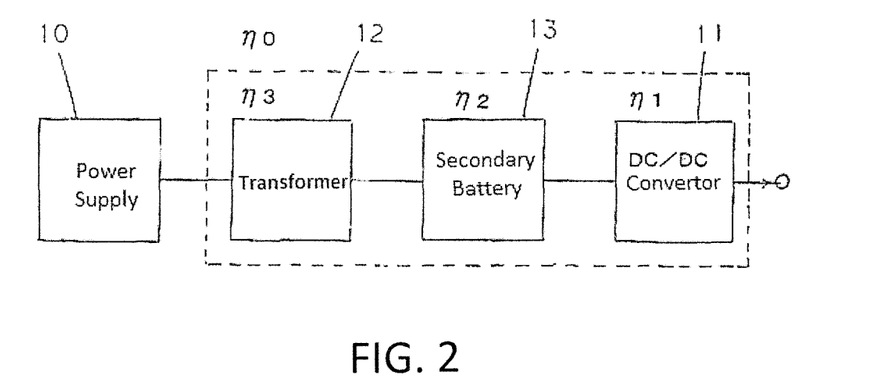
FIG. 2 illustrates a block diagram of a conventional home emergency power supply device.

FIG. 2 illustrates one such conventional power supply device. The power supply device is configured such that it includes a converter 12 configured to convert power from power supply 10, a secondary battery 13 chargeable by voltage from the converter 12, and a DC/DC converter 11 configured to convert voltage received from the secondary battery 13 and supply power, via a terminal, to electronics and electrical devices. The power supply device charges secondary battery 13 using converter 12, which converts power received from power supply 10 to DC power. Of course, this charging occurs when it is not necessary to supply power to devices.

Figure 3:
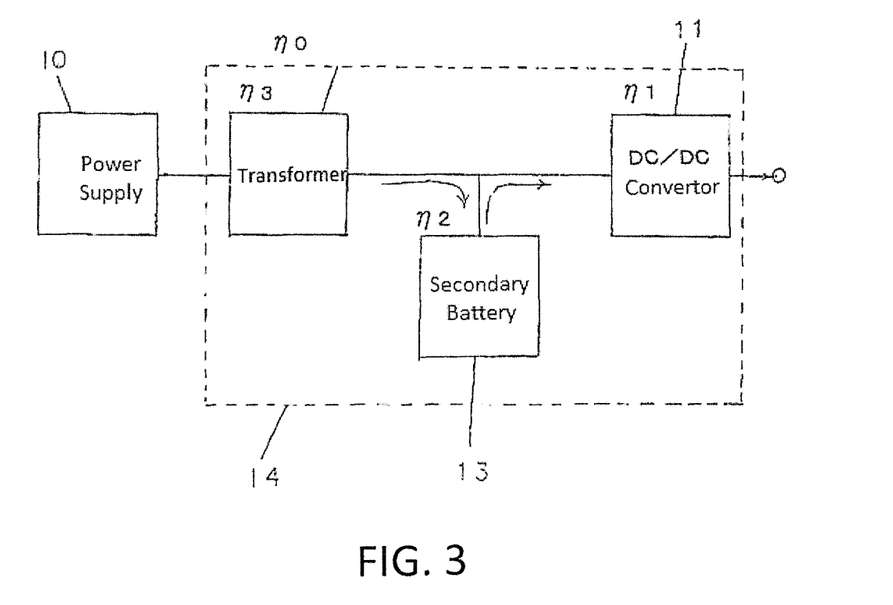
FIG. 3 illustrates a block diagram of a conventional electrical vehicle power supply device.

FIG. 3 discloses a traditional power supply device for use with electrical vehicles (EV), such as electrical cars, buses, and trains. The power supply device shown in FIG. 3 includes a converter 12 that converts power from power supply 10 into DC output power to charge secondary battery 13. When the electric vehicle is disconnected from the power supply 10, the power supply device supplies power to devices through DC/DC converter 11, which converts the DC power from the secondary battery 13.

These conventional power supply devices that include DC/DC converters (or AC/DC converters) may be sufficient for many small scale applications that do not need much power. However, for devices that require a larger power supply, using conventional technology necessitates increasing the scale of the power supply device. Increasing the size of a DC/DC converter, though, reduces the efficiency of the converter. In addition, the larger a power supply device gets, the larger its corresponding power consumption. Moreover, the inefficiencies of scale of conventional power supply devices prevent their use for transferring power between a wider array of objects.

Accordingly, it would be useful to improve the efficiency and shrink the size of power supply devices, as well as increase the flexibility of the power supply devices, such that a single system can receive power from and supply power to a variety of sources.

BRIEF SUMMARY

Accordingly, a method, apparatus, and computer program product are provided to improve power transfer and voltage conversion efficiency.

In an example embodiment, an apparatus is provided for increasing power supply efficiency. The apparatus includes a converter for converting and outputting power and a secondary battery, wherein the converter and the secondary battery are configured to receive power simultaneously, and wherein the secondary battery is further configured to serially output power to the converter. In this regard, the secondary battery may comprise a Lithium Ion battery.

In some embodiments, the converter comprises a DC/DC converter. In one such embodiment, the converter and the secondary battery may receive power from a DC power supply. In another such embodiment, the apparatus further includes a second converter connected to a first power supply, wherein the converter and the secondary battery are configured to receive power from the second converter. In this case, the apparatus may further include a third converter connected to a second power supply, wherein the second converter comprises a DC/DC converter connected to a DC power supply and the third converter comprises an AC/DC converter connected to an AC power supply, and wherein the converter and the secondary battery are configured to receive power from the third converter. In addition, the apparatus may further include an electric vehicle charging interface, wherein the converter is configured to output power to an electric vehicle through the electric vehicle interface. In this regard, the electric vehicle interface may be further configured to receive power from the electric vehicle, and the third converter may be a bidirectional converter.

In another embodiment, the converter may be an AC/DC converter. In this case, the converter may be configured to receive power from an AC power source. In one such embodiment, however, the secondary battery may receive power from a DC power source.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Conventional power supply devices that include DC/DC converters (or AC/DC converters), as described above, may be sufficient for many small scale devices that do not need much power. For devices that require a larger power supply, using such conventional technology necessitates increasing the scale of the power supply device. However, increasing the size of a DC/DC converter reduces the efficiency of the converter. In addition, the larger a power supply device gets, the larger its corresponding power consumption becomes. These inefficiencies can be explained with reference to FIG. 2.

For example, in FIG. 2 described above, when defining $\eta 1$ as an efficiency of the DC/DC converter 11, $\eta 1$ as an efficiency of secondary battery 13, and $\eta 3$ as an efficiency of converter 12, the overall efficiency $\eta 0$ of the device may be calculated as $\eta 0 = \eta 1 \times \eta 2 \times \eta 3$. Accordingly, a conventional problem is that each component in the power supply device contributes to the inefficiency of the overall device. For instance, when $\eta 1$, $\eta 1$, and $\eta 3$ are between 90-98%, the efficiency of the device is approximately 80%.

Example embodiments of the present invention solve this problem of inefficiency, providing devices and systems that reduce power consumption, are smaller, and accordingly less expensive.

An apparatus and system are provided in accordance with an example embodiment of the present invention to manage home power consumption from a variety of power sources. It should be noted that while FIGS. 4, 8, 9, and 10 illustrate example configurations of power supply devices in accordance with some embodiments, numerous other configurations may also be used to implement embodiments of the present invention. Elements shown in communication with each other should be considered to be capable of being embodied within the same device or within separate devices.

Embodiments of the present invention include a power supply device having one or more converters (DC/DC and/or AC/DC) that convert input power supplied from one or more power sources, and a secondary battery which is charged by receiving power supplied from power sources. In addition, however, embodiments described herein have the unique feature of increasing power output by serially connecting the secondary battery to the DC/DC converter and/or AC/DC converter. In some such embodiments, the secondary battery may comprise a Lithium Ion battery.

Moreover, in devices having only a DC power source, embodiments described herein may have a DC/DC converter that converts the voltage of the DC power source to a DC voltage usable to charge the secondary battery. Similarly, in devices having both a DC power source and an AC power source, the device may additionally use an AC/DC converter to convert power from the AC power source to a form that can charge the secondary battery.

In embodiments of the present invention, the secondary battery output is serially connected with the output of either a DC/DC convertor or an AC/DC convertor, such that the output of both devices may be added together to produce an overall output power of the power supply device. By reducing the power throughput of the DC/DC converter by sourcing a part of the output power directly from the secondary battery, the overall efficiency of the power supply device is greatly improved when compared to conventional power supply devices that do not include a secondary battery.

For a similar reason, embodiments of the present invention cost less to produce. In this regard, because the overall output power of the device includes the output from the DC/DC convertor and the output from the secondary battery, the DC/DC convertor can be smaller than the corresponding converter in conventional power supply devices, which in turn results in lower comparative power consumption and a lower cost of hardware.

Figure 4:
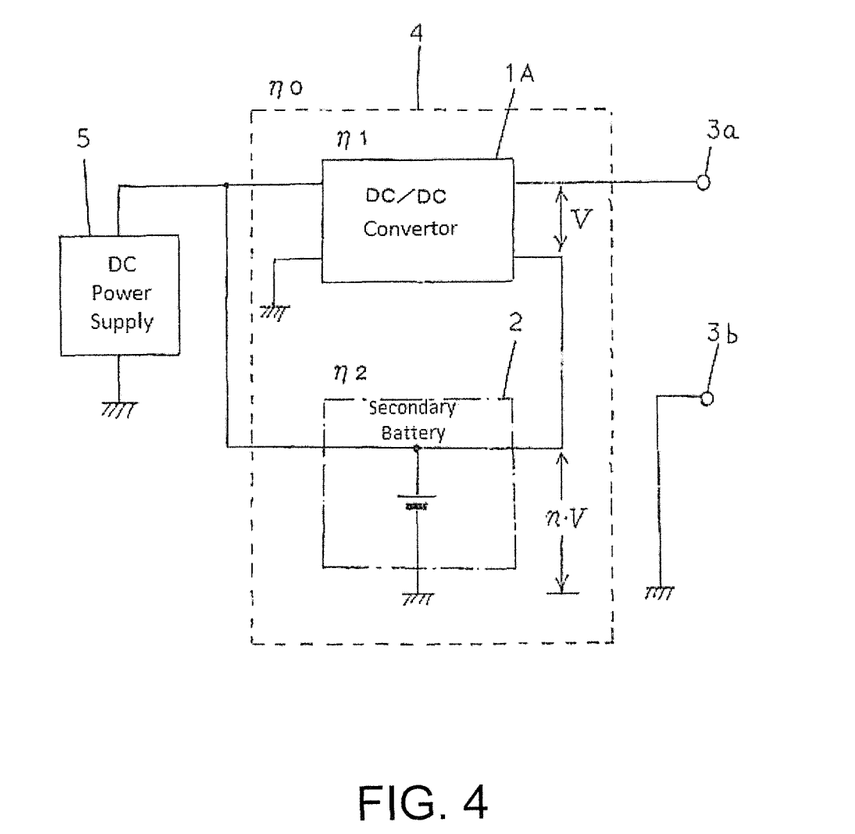
FIG. 4 illustrates a block diagram of a power supply device, in accordance with some example embodiments.

Turning now to FIG. 4, a circuit configuration of a power supply device in conjunction with battery storage is illustrated, in accordance with a first example embodiment. The device shown in FIG. 4 supplies power to electronic devices and electrical equipment through output terminals 3a and 3b. The DC power sourced from DC Power Supply 5 is converted by DC/DC Voltage Converting Section 4 prior to being output via the output terminals 3a and 3b. This conversion ensures that the voltage of the power has been converted to a voltage compatible with traditional electronics and electrical equipment. Accordingly, the voltage received from DC power supply 5 will not damage the devices connected to the terminals.

DC/DC Voltage Converting Section 4 comprises DC/DC Convertor 1A and Secondary Battery 2. As shown in FIG. 4, the power sourced from DC Power Supply 5 feeds both DC/DC Convertor 1A and Secondary Battery 2 in parallel. As further shown, Secondary Battery 2 is serially connected back to DC/DC Converter 1A. Thus, when a load is connected to the output terminals 3a and 3b, the power output from Secondary Battery 2 is serially combined with the power from DC/DC Convertor 1A to supply power to the load.

Figure 5:
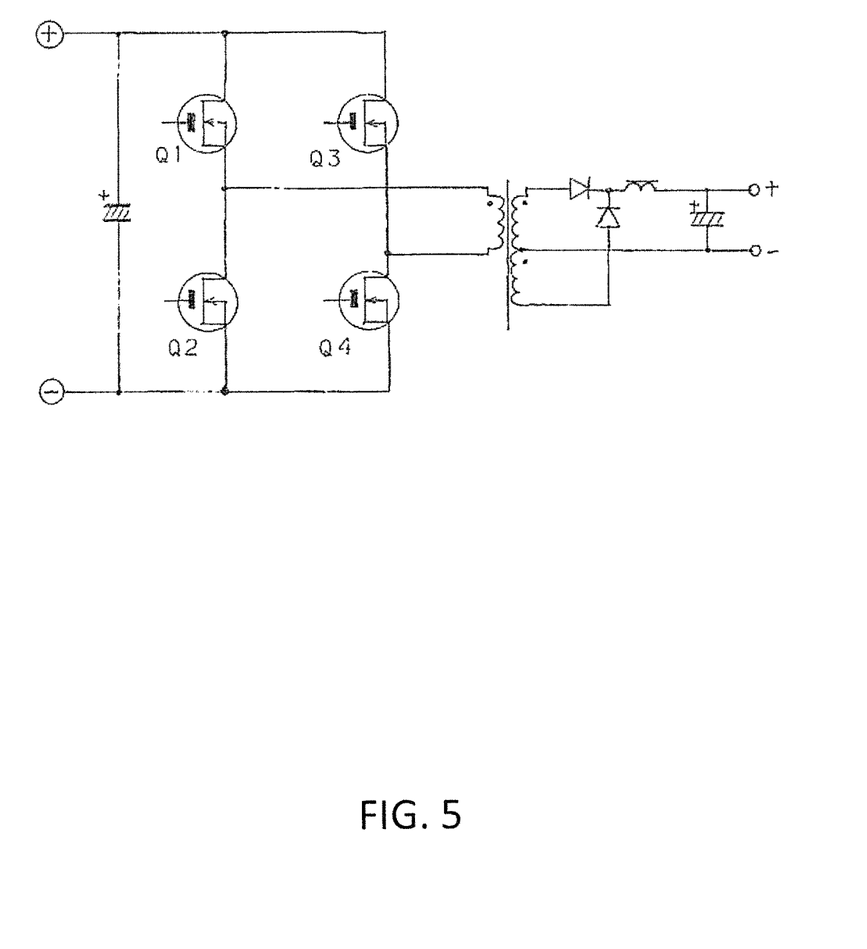
FIG. 5 illustrates a circuit diagram having specific circuit connections of a DC/DC converter usable in connection with the power supply device of FIG. 4, in accordance with some example embodiments.

Turning now to FIG. 5, example embodiments of the inputs and outputs of DC/DC Convertor 1A are shown that enable both (1) DC Power Supply 5 feeding power in parallel to DC/DC Convertor 1A and Secondary Battery 2; and (2) output power from serially combined both DC/DC Convertor 1A and Secondary Battery 2.

Embodiments of a power supply converting device described above improve the overall efficiency of the converting device comparing to conventional devices that only have a DC/DC convertor, as will be now discussed in connection with FIGS. 6 and 7. In this regard, Secondary Battery 2 may comprise a battery with an efficiency high enough to satisfy the equation $\eta 0 > \eta 1$, where the combined efficiency $\eta 0 = (\eta 1 + \eta 2)$, where $\eta 1$ comprises the efficiency of DC/DC Convertor 1A, and where $\eta 2$ comprises the efficiency of the Secondary Battery 2. As previously mentioned, in one such example, the Secondary Battery 2 may be a Lithium Ion battery.

Figure 6:
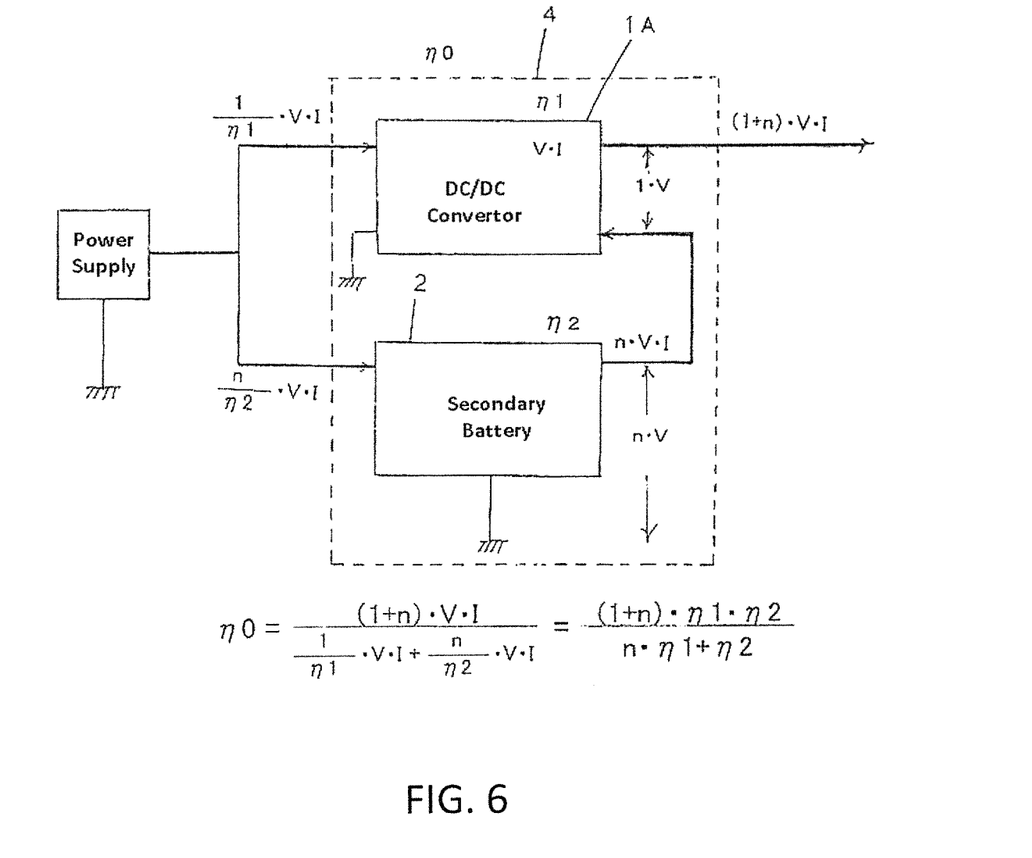
FIG. 6 illustrates a circuit diagram usable to calculate an overall efficiency of a power supply device, in accordance with some example embodiments.

Turning now to FIG. 6, an example circuit diagram is illustrated demonstrating the efficiency of the power supply device shown in FIG. 4. As shown in the circuit diagram, it is possible to calculate an overall efficiency of a power supply device, where $\eta 1$ is defined as the efficiency of DC/DC Convertor 1A, and $\eta 2$ is the efficiency of the Secondary Battery 2. In this context, V×I describes the output power of DC/DC Convertor 1A, and n×V×I describes the output power of the Secondary Battery 2. Moreover, $(1/\eta 1) \times V \times I$ describes the input from DC Power Supply 5 to DC/DC Convertor 1A, and $(n/\eta 2) \times V \times I$ describes the corresponding input to the Secondary Battery 2.

Based on the above descriptions, the overall efficiency $\eta 0$ of the DC/DC Converting Section 4 (the improved DC/DC Convertor) can be calculated as follows:

$$\eta 0 = \frac{(1 \times n) \times V \times I}{\frac{1}{\eta 1} \times V \times I + \frac{n}{\eta 2} \times V \times I} = \frac{(1+n) \times \eta 1 \times \eta 2}{n \times \eta 1 + \eta 2} \quad \text{(Equation 1)}$$

Figure 7:
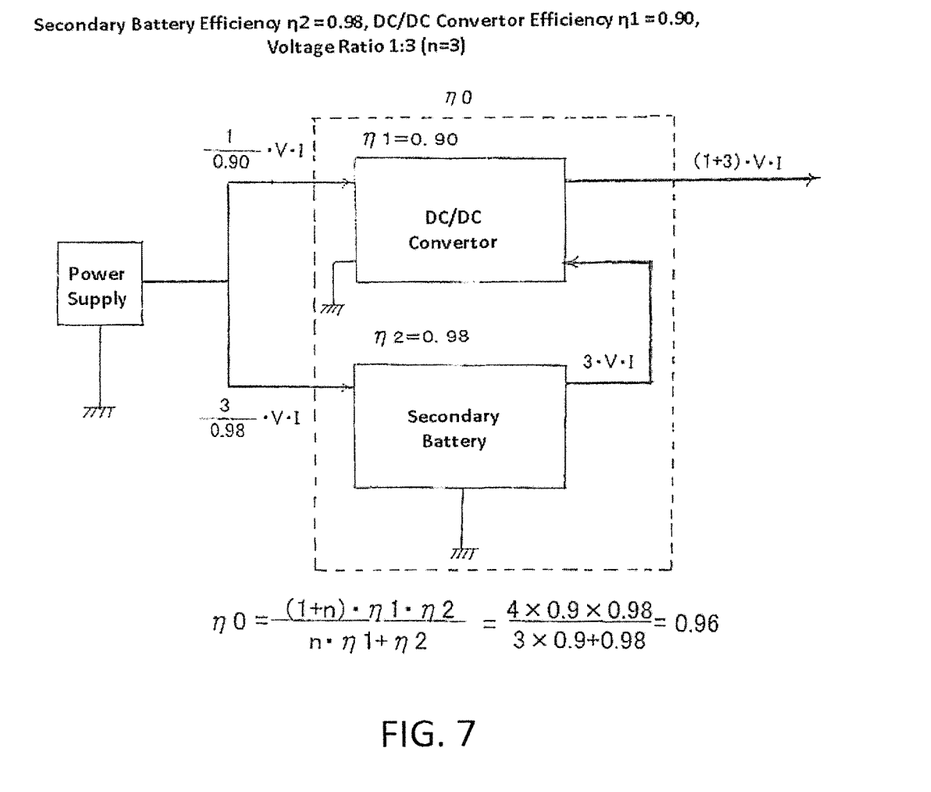
FIG. 7 illustrates a circuit diagram usable to calculate an actual efficiency value of a power supply device, in accordance with some example embodiments.

Turning now to FIG. 7, a specific example is shown, with which it is possible to calculate an efficiency $\eta 0$ of a sample embodiment of DC/DC Converting Section 4, where the efficiency $\eta 2$ of the Secondary Battery 2 is 0.98 (e.g., a Lithium Ion Battery), the efficiency 111 of the DC/DC Convertor 1A is 0.90, the voltage ratio of the DC/DC Convertor and Secondary Battery 2 is 1:3 (n=3), and the input and output of DC/DC Convertor and Secondary Battery 2 is shown. Using Equation 1 above, the efficiency $\eta 0$ can be calculated in this example as follows:

$$\eta 0 = \frac{(1+n) \times \eta 1 \times \eta 2}{n \times \eta 1 + \eta 2} = \frac{(1+3) \times 0.90 \times 0.98}{3 \times 0.90 + 0.98} = 0.96$$

As a result, the DC/DC Converting Section 4 (the improved DC/DC Convertor) has an overall efficiency of 0.96, versus the efficiency of the DC/DC converter standing alone, which has an efficiency of 0.90. As such, use of Secondary Battery 2 in a DC/DC converter, as shown above, improves the efficiency of DC/DC conversion when compared to a conventional convertor.

Figure 8:
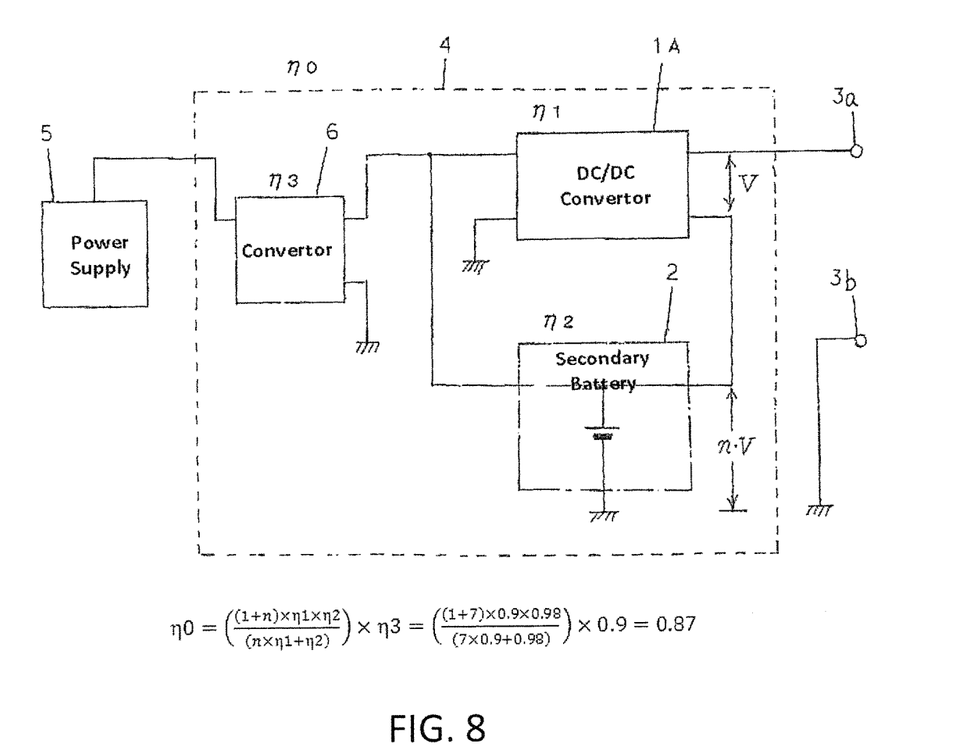
FIG. 8 illustrates a block diagram of another power supply device, in accordance with some example embodiments.

Turning now to FIG. 8, a second example power supply device is shown. The power supply device of FIG. 8 includes DC/DC Convertor Section 4 (comprising DC/DC Convertor 1A and Secondary Battery 2, as shown in FIG. 7), and also includes Convertor 6 between the DC Power Supply and DC/DC Convertor Section 4. Adding Convertor 6 enables the device to convert received power from a DC Power Supply 5 to an appropriate voltage to charge Secondary Battery 2.

As with the device described above in conjunction with FIG. 4, the device shown in FIG. 8 is configured such that power sourced from the DC Power Supply 5 may be fed in parallel to DC/DC Convertor 1A and Secondary Battery 2. Similarly, the device is configured to output power serially combined from the connected DC/DC Convertor 1A and Secondary Battery 2. As a result, for the reasons described above in connection with FIGS. 4 through 7, the device shown in FIG. 8 provides better converting efficiency than conventional convertors.

To illustrate this point, the device shown in FIG. 8 will now be described by comparison to the conventional power supply device shown in FIG. 2. As noted previously, FIG. 2 shows a conventional device consisting of a Power Supply Device 10, a Convertor 12, a Secondary Battery 13, and a DC/DC Convertor 11. Secondary Battery 13 is charged by power received from Power Supply 10 and converted by Convertor 12. While charging the Secondary Battery 13, the DC/DC Convertor 11 converts the charged voltage of the Secondary Battery 13 and outputs power from the device. The overall efficiency $\eta 0$ of the conventional Power Supply Device of FIG. 2 can be calculated as the efficiency of Converter 12 times the efficiency of the Secondary Battery 13 times the efficiency of the DC/DC Converter 11. As shown in FIG. 2, $\eta 1$ refers to the efficiency of DC/DC Convertor 11, $\eta 2$ is the efficiency of Secondary Battery 13, and $\eta 3$ is the efficiency of Convertor 12. Accordingly, $\eta 0 = \eta 1 \times \eta 2 \times \eta 3$. When $\eta 1 = 90\%$, $\eta 2 = 98\%$, and $\eta 3 = 90\%$, the overall efficiency $\eta 0$ is 79%.

By contrast, the efficiency of the example power supply device shown in FIG. 8 is calculated based on Equation 1 above. However, in FIG. 8, Equation 1 calculates the efficiency of $$\frac{\eta 0}{\eta 3},$$

because Equation 1 does not factor the effect of converter 6 on the efficiency of the power supply device. This efficiency can be described as:

$$\frac{\eta 0}{\eta 3} = \frac{(1+n) \times \eta 1 \times \eta 2}{n \times \eta 1 + \eta 2}$$

Accordingly, multiplying both sides by $\eta 3$ to solve for the overall efficiency $\eta 0$, the following equation is produced for calculating the efficiency of the power supply device of FIG. 5:

$$\eta 0 = \left( \frac{(1+n) \times \eta 1 \times \eta 2}{(n \times \eta 1 + \eta 2)} \right) \times \eta 3 \quad \text{(Equation 2)}$$

Consider the example of a 48 Volt (V) output from Convertor 6 to charge Secondary Battery 2, such that the Secondary Battery 2 is charged up to a maximum of 48V. 48V is output from Output Terminals 3a and 3b, and the voltage at the terminals combines a 6V output from the DC/DC Convertor 1A with a 42V output from the serially connected Secondary Battery 2. As a result, using Equation 2 above to calculate the efficiency of the device of FIG. 5, $(1+n) \times V = 48$ volts, where V=6 and n=7, and where, as noted above $\eta 1$ is 0.9, $\eta 2$ is 0.98, and $\eta 3$ is 0.9, according to Equation 2:

$$\eta 0 = \left( \frac{(1+n) \times \eta 1 \times \eta 2}{(n \times \eta 1 + \eta 2)} \right) \times \eta 3 = \left( \frac{(1+7) \times 0.9 \times 0.98}{(7 \times 0.9 + 0.98)} \right) \times 0.9 = 0.87$$

Accordingly, the overall efficiency $\eta 0$ of the power supply device of FIG. 8 is equal to 87%, confirming that the power supply device of FIG. 8 has better efficiency than conventional devices (e.g., such as the device shown in FIG. 2, which has an efficiency of only 79%). When the output current I is 20 Amperes (A), the capacity of conventional DC/DC Convertor 11 shown in FIG. 2 is 48V×20 A=960 Watts (W). However, DC/DC Convertor 1A need only have a maximum voltage output of 12V (normally 6~12V) and a capacity of 12V×20 A=240 W. This means a smaller size and capacity DC/DC convertor can be used for the power supply device of FIG. 8 than for conventional devices, and as a result, the power supply device as a whole can be smaller and produced at lower cost.

Figure 9:
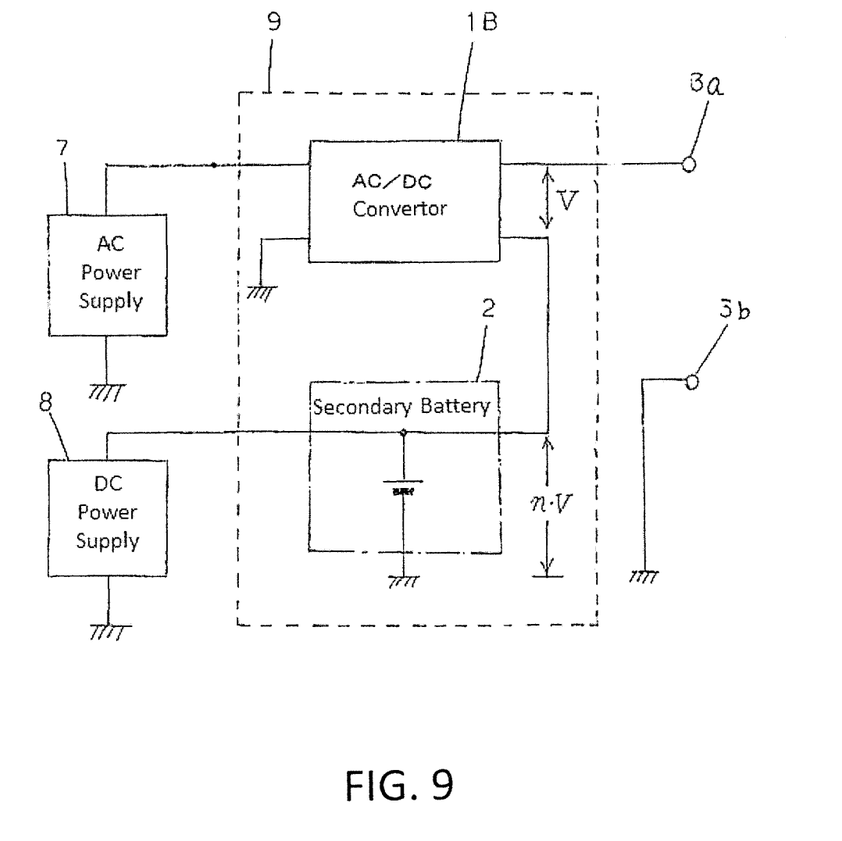
FIG. 9 illustrates a block diagram of yet another power supply device, in accordance with some example embodiments.

Turning now to FIG. 9, another example embodiment is illustrated. This embodiment of the power supply devices includes AC Power Supply 7, AC/DC Convertor Section 9 and output terminals 3a and 3b, as shown in FIG. 9. AC Power supplied by AC Power Supply 7 is converted to voltage by AC/DC Convertor Section 9, and then used to supply power to electronics devices as well as electric equipment through output terminal 3a and 3b.

AC/DC Convertor Section 9 includes AC/DC Convertor 1B and Secondary Battery 2. While AC/DC Convertor 1B receives electric power from AC Power Supply 7, another DC voltage from DC Power Supply 8 is received by and charges Secondary Battery 2. Accordingly, the power supply device of FIG. 9 is able to output DC Power from output terminals 3a and 3b by serially combining the electrical power output of AC/DC Convertor 1B and Secondary Battery 2.

The power supply device of FIG. 9 is different from the Power Supply Device shown in FIG. 4 (where input power from the DC Power Supply is converted and output by DC/DC Convertor 1A), because AC/DC Convertor 1B converts AC power supplied by AC Power Supply 7 to DC power after voltage conversion. In addition, the power supply device of FIG. 9 also includes DC Power Supply 8 to charge Secondary Battery 2. Otherwise, however, the power supply device of FIG. 9 employs a similar concept to those of FIGS. 4 and 8, and combines the serially connected output of AC/DC Convertor 1B and Secondary Battery 2.

In this fashion, the power supply device of FIG. 9 is more efficient than conventional devices only equipped with an AC/DC convertor, and decreases the power consumption of its convertor (AC/DC Converter 1B). With a lower level of power consumption, the overall power supply devices can be smaller, and therefore more cost-effective, than conventional power supply devices.

Figure 10:
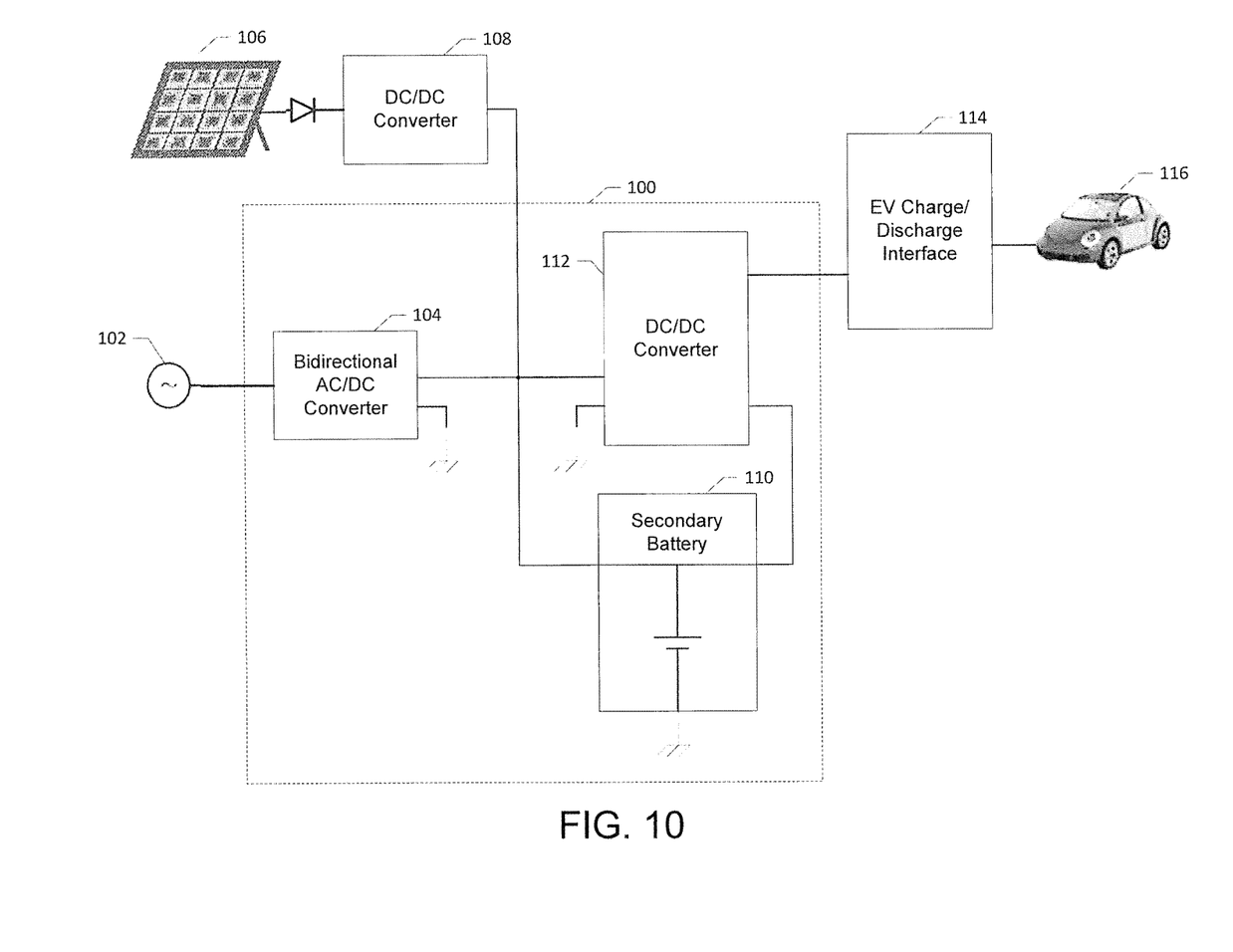
FIG. 10 illustrates a block diagram of yet another power supply device, in accordance with some example embodiments.

Turning now to FIG. 10, another example embodiment is illustrated. In this embodiment, power supply device 100 connects to an AC power supply 102 (e.g., an electric grid) via a bidirectional AC/DC converter 104. Similarly, power supply device 100 connects to a DC power supply 106 (e.g., a photovoltaic array or other type of solar power source, a wind or thermal power source, or any other type of power generator that may be used by an individual or business, such as one or more gas, propane, diesel, or natural gas generators, or the like) via DC/DC converter 108. The power supply device 100 further includes a DC/DC converting section including secondary battery 110 and DC/DC converter 112. In addition, while the power supply device 100 may be connected to any number of electrical or electronic devices via terminals (such as terminals 3a and 3b of FIGS. 4, 8, and 9), in the example illustrated in FIG. 10, power supply device 100 is connected, via an EV Charge/Discharge Interface 114, to an electric vehicle 116.

Bidirectional AC/DC convertor 104 receives and converts electric power from AC power supply 102 while DC voltage from DC power supply 106 is received by DC/DC converter 108. Either power supply (or both) can thus be used to charge secondary battery 110. Moreover, either power supply (or both) can provide power, in parallel, to DC/DC converter 112 and secondary battery 110. Accordingly, the power supply device of FIG. 10 is able to output DC Power to EV Charge/Discharge interface 114 by serially combining the electrical power output of AC/DC Convertor 1B and Secondary Battery 2, thus reaping the gains in efficiency described above in connection with FIGS. 4, 8, and 9.

The power supply device of FIG. 10 is different from those shown in FIGS. 4, 8, and 9, though, because power can flow both ways through power supply device 100. In this regard, EV Charge/Discharge Interface 114 can transfer power from electric vehicle 116 back to the power supply device 100, and bidirectional AC/DC converter 104 can return power to AC power supply 102 (e.g., selling power to the electric grid). Accordingly, the power supply device 100 illustrated in FIG. 10 is configured to transfer power from both AC and DC power supplies, while also adding the flexibility to connect to devices that can optionally return power back to a power source.

In this fashion, the power supply device of FIG. 10 is more efficient than conventional devices and decreases the power consumption of its DC/DC converter 112. With a lower level of power consumption, the overall power supply devices can be smaller, and therefore more cost-effective, than conventional power supply devices, while still providing the additional flexibility referenced above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for increasing power supply efficiency, the apparatus comprising:
   a converter for converting received power and outputting power;
   one or more output terminals configured to only receive power via the converter; and
   a rechargeable battery;
   a second converter connected to a first power supply, wherein the converter and the rechargeable battery are configured to receive power from the second converter;
   a third converter connected to a second power supply, wherein the second converter comprises a DC/DC converter connected to a DC power supply and the third converter comprises an AC/DC converter connected to an AC power supply,
   wherein the converter and the rechargeable battery are configured to receive power from the third converter, wherein the converter and the rechargeable battery are configured to receive power simultaneously, and wherein the rechargeable battery is further configured to output power to the converter.

2. The apparatus of claim 1, wherein the converter comprises a DC/DC converter.

3. The apparatus of claim 2, wherein the converter and the rechargeable battery receive power from a DC power supply.

4. The apparatus of claim 1, further comprising an electric vehicle charging interface, wherein the converter is configured to output power to an electric vehicle through the electric vehicle interface.

5. The apparatus of claim 4, wherein the electric vehicle interface is further configured to receive power from the electric vehicle, and wherein the third converter comprises a bidirectional converter.

6. The apparatus of claim 1, wherein the converter comprises an AC/DC converter.

7. The apparatus of claim 6, wherein the converter receives power from an AC power source.

8. The apparatus of claim 7, wherein the rechargeable battery receives power from a DC power source.

9. The apparatus of claim 1, wherein the rechargeable battery comprises a Lithium Ion battery.

\* \* \* \* \*